United States Patent [19]

Oleck et al.

[11] 4,428,865

[45] Jan. 31, 1984

[54] CATALYST COMPOSITION FOR USE IN PRODUCTION OF HIGH LUBRICATING OIL STOCK

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 426,531

[22] Filed: Sep. 29, 1982

Related U.S. Application Data

[62] Division of Ser. No. 224,777, Jan. 13, 1981, Pat. No. 4,372,839.

[51] Int. Cl.³ .............................................. B01J 29/28
[52] U.S. Cl. ........................................................ 502/77
[58] Field of Search ...................................... 252/455 Z

[56] References Cited

U.S. PATENT DOCUMENTS

| | | | |
|---|---|---|---|
| 3,686,121 | 8/1972 | Kimberlin, Jr. et al. | 252/455 Z |
| 3,755,138 | 8/1973 | Chen et al. | 252/455 Z |
| 3,758,403 | 9/1973 | Rosinski et al. | 252/455 Z |
| 4,229,282 | 10/1980 | Peters et al. | 208/111 |

*Primary Examiner*—Carl F. Dees
*Attorney, Agent, or Firm*—Alexander J. McKillop; Charles J. Speciale; Michael G. Gilman

[57] ABSTRACT

A method for enhancing both the pour point and viscosity index (V.I.) of crude oils of high wax content by contact of the same with two different zeolites, such as ZSM-5 and ZSM-35 is disclosed.

3 Claims, 1 Drawing Figure

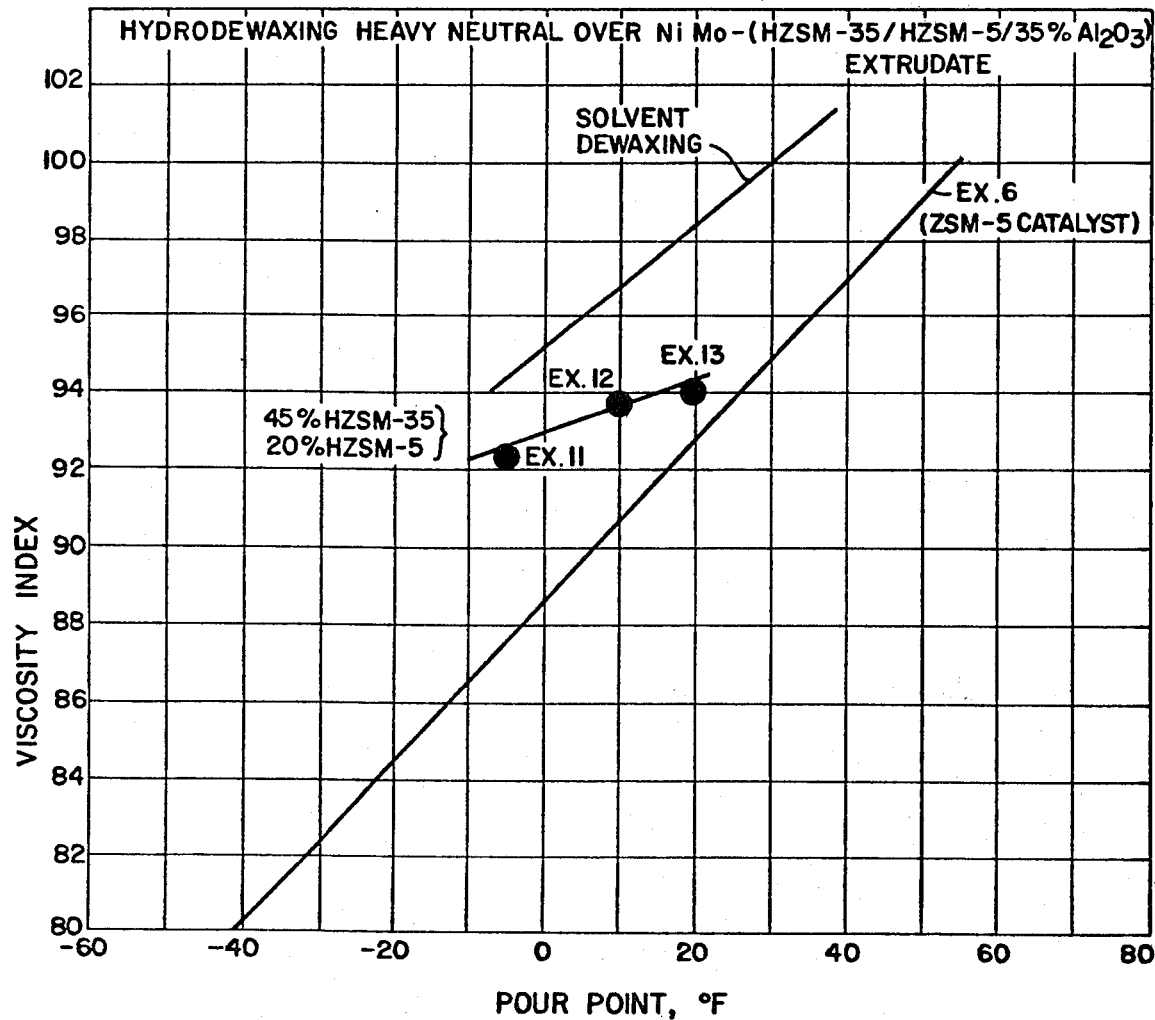

CATALYST COMPOSITION FOR USE IN PRODUCTION OF HIGH LUBRICATING OIL STOCK

This is a division of copending application Ser. No. 224,777, filed Jan. 13, 1981, now U.S. Pat. No. 4,372,839.

BACKGROUND OF THE INVENTION

1. Field of the Invention

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude oils of high wax content. This invention is specifically directed to catalytically dewaxing a waxy distillate lubricating oil utilizing two different crystalline aluminosilicate zeolite catalysts of particularly defined characteristics to obtain a lubricating oil of low pour point and of high V.I.

2. Discussion of Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constitutents display almost all conceivable structure types. This complexity and its consequences are referred to in well known treatises, such as, for example, in "Petroleum Refinery Engineering," by W. L. Nelson, McGraw-Hill Book Company, Inc., New York, N.Y., 1958 (Fourth Edition).

In general, the basic premise in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having different properties. Or, the refined lubricant stock, prior to use as a lubricant, may be compounded with one or more additives which function, for example, as antioxidants, extreme pressure additives, and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfalane, or chlorex, which is selective for aromatic hydrocarbons, and which removes undesirable components. The raffinate from solvent refining is then dewaxed, for example, by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This index indicates the degree of change of viscosity with temperature. A high viscosity index of 100 indicates an oil that does not tend to become viscous at low temperature or become thin at high temperatures. Measurement of the Saybolt Universal Viscosity of an oil at 100° and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race St., Philadelphia, PA, or equivalent.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. Suitable stocks for high V.I. oils, however, also contain substantial quantities of waxes which result in solvent-refined lubricating oil stocks of high pour point. Thus, in general, the refining of crude oil to prepare acceptable high V.I. distillate stocks ordinarily includes dewaxing to reduce the pour point.

In recent years, catalytic techniques have become available for dewaxing of petroleum stocks. A process of that nature developed by British Petroleum is described in The Oil and Gas Journal dated Jan. 6, 1975, at pages 69-73. See also U.S. Pat. No. 3,668,113.

In U.S. Pat. No. Re. 28,398 to Chen et al. is described a process for catalytic dewaxing with a catalyst comprising zeolite ZSM-5. Such a process combined with catalytic hydrofinishing is described in U.S. Pat. No. 3,894,938. U.S. Pat. No. 3,755,138 to Chen et al. describes a process for mild solvent dewaxing to remove high quality wax from a lube stock, which is then catalytically dewaxed to specification pour point. The entire contents of these patents are herein incorporated by reference.

U.S. Pat. No. 4,053,532 is directed towards a hydrodewaxing operation involving a Fischer-Tropsch synthesis product utilizing ZSM-5 type zeolites.

U.S. Pat. No. 3,956,102 is concerned with a process involving the hydrodewaxing of petroleum distillates utilizing a ZSM-5 type zeolite catalyst.

U.S. application Ser. No. 52,718, filed June 27, 1979 (now U.S. Pat. No. 4,247,388) in the name of Banta et al. describes dewaxing operations utilizing ZSM-5 type zeolites of specific activity.

U.S. application Ser. No. 23,855, filed Mar. 26, 1979 (now U.S. Pat. No. 4,222,855) describes dewaxing operations to produce lubricating oils of low pour point and of high V.I. utilizing a special class of zeolites which includes ZSM-23 and ZSM-35.

It should be immediately recognized that the expressions "low pour point" and "high Viscosity Index" are relative ones and there still exists a very real need to enhance one or both of these properties of lubricating oils.

Thus, although some of the catalytic dewaxing processes of the prior art do, indeed, result in the production of lubricating oils of enhanced properties, nevertheless, the instant invention is concerned with an improved process wherein pour point specifications can be met and the resulting product will have a higher V.I. than has heretofore been possible with prior art catalytic dewaxing operations.

SUMMARY OF THE INVENTION

This invention is concerned with a catalytic dewaxing operation which results in the production of a lubricating oil having an enhanced V.I. at a given pour point. It should be recognized that there are certain minimum values of pour point which lubricating oils must possess to be commercially useful. Although there is a certain amount of flexibility concerning pour point specification, nevertheless, target pour points for products differ depending on whether heavy or light neutral stocks are being produced. In general, it is necessary that the pour point of a heavy neutral stock be no higher than about 20° F. and the pour point of a ight neutral stock be no higher than about 5° F. The expression "heavy neutral" is intended to include a stock typically having the following properties:

|  | Charge | Product |
|---|---|---|
| API Gravity | 29.2 | 27.8 |
| Pour point, °F. | 105 | 20 |
| Viscosity, CS | | |
| Kv at 100° F. | 81.9 | 108.4 |
| Kv at 210° F. | 9.95 | 10.99 |
| Boiling Range (IBP-95%), °F. | 632-970 | 669-983 |

The expression "light neutral" is intended to include a material having the following properties:

|  | Charge | Product |
|---|---|---|
| API Gravity | 32.1 | 29.6 |
| Pour point, °F. | 95 | 5 |
| Viscosity, CS | | |
| Kv at 100° F. | — | 37.84 |
| Kv at 130° F. | 14.28 | — |
| Kv at 210° F. | 4.47 | 5.64 |
| Boiling Range (IBP-95%), °F. | 687-847 | 716-844 |

It has now been discovered that lubricating oils of enhanced pour point and V.I. can be obtained by first dewaxing a particular charge stock with a crystalline aluminosilicate zeolite from the class of ZSM-35 and ZSM-23, followed by treatment with a ZSM-5 or ZSM-11 zeolite. Although it is within the scope of this invention to first contact the charge stock with ZSM-5 and/or ZSM-11, followed by ZSM-35 and/or ZSM-23, the reverse order is preferred. It is also within the concept of this invention to carry out a single stage operation utilizing a mixture of ZSM-5 and/or ZSM-11 and ZSM-23 and/or ZSM-35 either as separate particles or contained within the same pellet.

DESCRIPTION OF PREFERRED EMBODIMENTS

One embodiment of this invention resides in simply carrying out the dewaxing operation disclosed and claimed in copending application Ser. No. 23,855, filed Mar. 26, 1979, the entire disclosure of which is incorporated herein by reference, followed by carrying out the dewaxing operation with ZSM-5 type zeolites disclosed in U.S. Pat. No. Re. 28,398. In the above-described embodiment, the process is obviously a two-stage process but, as is heretofore indicated, such is not the only method of carrying out the novel process of this invention.

It is also possible to carry out a one-stage process utilizing a mixture of ZSM-5 or ZSM-11 and a crystalline aluminosilicate zeolite set forth in said U.S. application Ser. No. 23,855 which are defined as possessing particularly defined characteristic pore openings defined by (1) a ratio of sorption of n-hexane to o-xylene, on a volume percent basis, of greater than 3, which sorption is determined at a $P/P_o$ of 0.1 and a temperature of 50° C. for n-hexane and 80° C. for o-xylene; and (2) by the ability of selectively cracking 3-methylpentane in preference to 2,3-dimethylbutane at 1000° F. and 1 atmosphere pressure from a 1/1/1 weight ratio mixture of n-hexane/3-methylpentane/2,3-dimethylbutane mixture with the ratio of rate constants $k_{3MP}/k_{DMB}$ being in excess of about 2.

The expression of "$P/P_o$," as utilized herein, is accorded its usual significance as described in the literature for example, in "The Dynamical Character of Adsorption" by J. H. deBoer, 2nd Edition, Oxford University Press (1968) and is the relative pressure defined as the ratio of the partial pressure of sorbate to the vapor pressure of sorbate at the temperature of sorption. The ratio of the rate constants, $k_{3MP}/k_{DMB}$, are determined from first order kinetics, in the usual manner, by the following equation:

$$k = \frac{1}{T_c} \ln \frac{1}{1 - \epsilon}$$

where k is the rate constant for each component, $T_c$ is the contact time and $\epsilon$ is the fractional conversion of each component.

It is to be understood that the mixture of ZSM-5 and/or ZSM-11 with at least one aluminosilicate zeolite of the type set forth in U.S. application Ser. No. 23,855 is intended to include a mixture of discrete particles of each zeolite (preferably in admixture with a suitable binder such as alumina), as well as having the different zeolites in the same pellet.

The recovered dewaxed oil so produced has a V.I. considerably higher than that obtained with ZSM-5 catalyst described in the aforementioned prior art and a lower pour point than is possible with the use of ZSM-35 or 23 alone. In a particular preferred embodiment, both the crystalline aluminosilicate zeolites utilized in the process of this invention are in the hydrogen form and both may be employed in conjunction with a hydrogenation component, such as platinum, palladium, zinc, cobalt, nickel, molybdenum, tungsten or mixtures thereof in the presence of hydrogen.

The charge stock used in the process of this invention includes hydrocracked petroleum oils boiling within the aforenoted range as well as other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention a viscous distillate fraction of crude petroleum oil isolated by vacuum distillation of a reduced crude from atmospheric distillation is solvent refined by countercurrent extraction with at least an equal volume (100 vol. %) of a selective solvent such as furfural. It is preferred to use 1.5 to 2.5 volumes of solvent per volume of oil. The raffinate is subjected to catalytic dewaxing by mixing with hydrogen and contacting at about 500 to about 675° F. with a catalyst comprising the above described crystalline aluminosilicate zeolites, preferably containing a hydrogenation component.

In some instances, it may be desirable to partially dewax the solvent-refined stock by conventional solvent dewaxing techniques prior to catalytic dewaxing. The higher melting point waxes so removed are those of greater hardness and higher market value than the waxes removed in taking the product to a still lower pour point.

In general, hydrodewaxing conditions include a temperature between about 500 and about 675° F., a pressure between about 100 and about 3000 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and 4000 standard cubic feet (scf) of hydrogen per barrel of feed.

The catalytic dewaxing process of this invention may be conducted by contacting the feed to be dewaxed with a fixed stationary bed of the defined crystalline aluminosilicate zeolite catalysts, or with a transport bed, as desired. A simple and therefore preferred configuration is a trickle-bed operation in which the feed is allowed to trickle through a stationary fixed bed, preferably in the presence of hydrogen. With such configuration, it is of considerable importance in order to obtain the benefits of this invention to initiate the reaction with a fresh catalyst at a temperature of about 500° F. This temperature is of course raised as the catalyst ages, in order to maintain catalytic activity. In general, the run is terminated at an end-of-run temperature of about 675° F., at which time the catalyst may be reactivated by contact at elevated temperature with hydrogen gas, or regenerated by contact with oxygen-containing gas.

ZSM-23 is described in U.S. Pat. No. 4,076,842, the entire contents of which are incorporated herein by reference.

ZSM-35 is described in U.S. Pat. No. 4,016,245, the entire contents of which are incorporated herein by reference.

In the following table, the sorption ratio (volume %) of n-hexane/o-xylene, at a temperature of 50° C. and $P/P_o$ of 0.1 for the sorption of n-hexane and 80° C. and $P/P_o$ of 0.1 for o-xylene together with the rate constant ratio $k_{3MP}/k_{DMB}$, above defined, are shown for ZSM-23, ZSM-35, ZSM-5 and ZSM-11.

TABLE I

|  | ZSM-23 | ZSM-35 | ZSM-5 | ZSM-11 |
|---|---|---|---|---|
| n-hexane/o-xylene | 3.3 | 5.8 | 2.5 | 1.6 |

TABLE I-continued

|  | ZSM-23 | ZSM-35 | ZSM-5 | ZSM-11 |
|---|---|---|---|---|
| $k_{3MP}/k_{DMB}$ | 11 | 6.3 | 1.5 | 1.5 |

It will be evident from the above that ZSM-23 and ZSM-35 satisfy the criteria for zeolites utilized in the process of this invention of having a n-hexane/o-xylene sorption ratio under the specified conditions of greater than 3 and a $k_{3MP}/k_{DMB}$ ratio of in excess of about 2, whereas ZSM-5 and ZSM-11 do not fulfill these conditions.

The original cations associated with each of the crystalline aluminosilicate zeolites utilized herein may be replaced by a wide variety of other cations according to techniques well known in the art. Typical replacing cations include hydrogen, ammonium and metal cations, including mixtures of the same. Of the replacing metallic cations, particular preference is given to cations of metals such as rare earth metals, manganese, calcium, as well as metals of Group II of the Periodic Table, e.g. zinc, and Group VIII of the Periodic Table, e.g. nickel, platinum and palladium.

Typical ion exchange techniques would be to contact the particular zeolite with a salt of the desired replacing cation. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with solution of the desired replacing cation, the zeolite is then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found that catalyst of improved selectivity and other beneficial properties may be obtained by subjecting the zeolite to treatment with steam at elevated temperature ranging from 500° F. to 1200° F. and preferably 750° F. to 1000° F. The treatment may be accomplished in an atmosphere of 100% steam or an atmosphere consisting of steam and a gas which is substantially inert to the zeolites.

A similar treatment can be accomplished at lower temperatures and elevated pressure, e.g. 350°–700° F. at 10 to about 200 atmospheres. The crystalline aluminosilicate zeolite utilized in the process of this invention is desirably employed in intimate combination with one, or more, hydrogenation components in an amount between about 0.1 and about 25 weight percent, such as tungsten, vanadium, zinc, molybdenum, rhenium, nickel, cobalt, chromium, manganese, or a noble metal such as platinum or palladium. Such component can be exchanged into the composition, impregnated thereon or physically intimately admixed therewith. Such component can be impregnated into or onto the zeolite such as, for example, by in the case of platinum, by treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound.

Both types of compounds which contain the metal in the ionic state can be used. A solution in which platinum metals are in the form of a cation or cationic complex, e.g. Pt(NH$_3$)$_4$Cl$_2$ is particularly useful.

Prior to use, the zeolites should be dehydrated at least partially. This can be done by heating to a temperature in the range of 200° to 600° C. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

A preferred method for preparing the catalyst is to blend the zeolite with inorganic oxide like alumina hydrates, form the composite into extrudates, dry the extrudate and calcine in an atmosphere such as nitrogen or air. The extrudate may then be exchanged with cations like ammonium and recalcined, prior to impregnation with hydrogenation type metals such as molybdenum, nickel and cobalt. Drying and calcining subsequent to impregnation is then used to complete the preparation.

Where operation in the dewaxing step is carried out in the presence of the zeolite catalysts that have no or insufficient hydrogenation function such that a product of insufficient stability results, it is contemplated that a hydrotreating step would follow the dewaxing. This hydrotreating would use a catalyst comprising a hydrogenation component on a non-acidic support.

The catalysts of this invention are typically prepared by extruding a mixture of 65% unexchanged zeolite (i.e., as crystallized, Na form) and 35% alumina.

The extrudate is dried and then calcined in flowing N$_2$ for three hours at 1000° F. and then in air for three hours at 1000° F.

It is exchanged with NH$_4$NO$_3$ solution to obtain product having low sodium content, dried, recalcined in air for three hours at 1000° F. The extrudate is then impregnated with solutions containing salts of the desired hydrogenation metal components, dried and recalcined at 1000° F.

This is the general procedure for making all the catalysts. The zeolites are not acid exchanged as such but are converted to the H form during calcination.

If Ni is exchanged, it is generally immediately after the NH$_4$+ exchange.

Catalysts, prepared as described above, were tested in a batch, shaker bomb unit that has been described in Ind. Eng. Chem., Vol. 50, page 47 (1958). The unit consists of a cylindrical one-liter pressure vessel mounted at the end of a reciprocating piston. An engine drives the piston up and down 200 strokes per minute. While the bomb is shaken in this manner, it moves through the center of a stationary induction coil. The bomb serves as a susceptor, and its contents are heated inductively to 550° F. in 2-3 minutes. At the end of a run, the reactor is cooled in 2-3 minutes using a water spray. A thermocouple is located in a central thermowell. The reactor is connected to a pressurized gas system through loops of flexible tubing; hydrogen is supplied during the reaction period to maintain pressure.

In the examples which follow, the charge stock was a heavy neutral raffinate stock having the following properties:
API Gravity: 29.2
Pour Point: 105° F.
Viscosity:
Kv at 130° F.: 38.72 centistokes
Kv at 210° F.: 9.26 centistokes
Boiling range: 632°-970° F. (95% point)

The following examples will serve to illustrate the process of the invention without limiting the same.

EXAMPLE 1

Heavy neutral (88 grams) was hydrodewaxed with 17.6 grams of a nickel and molybdenum-impregnated extrudate (65% HZSM-35 and 35% Al$_2$O$_3$) at 500 psig and 550° F. in the shaker bomb. After 130 minutes reaction, the shaker bomb was opened and 17.6 grams of a nickel and molybdenum-impregnated extrudate (65% HZSM-5 and 35% Al$_2$O$_3$) were added. The reaction was continued at 500 psig and 550° F. for another 65 minutes for a total of 195 minutes reaction time.

The 650° F.+ product had a 10° F. pour point and 95.4 V.I. As is obvious, this product had a sufficiently low pour point (10° F.) to more than meet practical specifications.

EXAMPLE 2

The procedure of Example 1 was repeated with the exception that only the initial 17.6 grams of the ZSM-35 catalyst was used for the entire 195 minute run (NO ZSM-5 catalyst was added).

The 650° F.+ product had a 70° F. pour point—obviously too high.

EXAMPLE 3

Two 130 minute hydrodewaxing runs were made at 500 psig with the same ZSM-5 catalyst of Example 1 (no ZSM-35 catalyst) using 88 grams of oil and 17.6 grams of the ZSM-5 catalyst. One run was carried out at 550° F. and the other at 525° F.

The 650° F.+ products had the following properties:

| Temp., °F. | Pour Point, °F. | V.I. |
|---|---|---|
| 525 | 30 | 95.6 |
| 550 | 5 | 91.5 |

By linear interpolation, the 10° F. pour point product would have a 92.3 V.I. This compares with the product from Example 1 as follows:

|  | Pour Point, °F. | V.I. |
|---|---|---|
| Example 1 | 10 | 95.4 |
| Example 3 | 10 | 92.3 |
| Advantage for Ex. 1 |  | 3.1 |

These results on Examples 1, 2 and 3 demonstrate:
(1) The ZSM-35 catalyst alone is incapable of reducing pour point to the desired low level;
(2) The ZSM-5 catalyst alone does reduce pour point to the desired level, but the product has lower V.I.;
(3) The combination process of ZSM-35 catalyst first and then the ZSM-5 catalyst produces low pour point and high V.I.

EXAMPLE 4

A 195 minute run was made at the same conditions of Example 1 except that the catalyst used was 17.6 grams of equal parts by weight of a mixture of the ZSM-5 and the ZSM-35 catalysts used in said Example 1.

The 650° F.+ product had a 15° F. pour point and 94.5 V.I.

Again, by linear interpolation of the results from Example 3, the 15° F. pour point product from a run with the ZSM-5 catalyst would have a 93.1 V.I. This compares with the above product from Example 4 as follows:

|                  | Pour Point, °F. | V.I. |
|------------------|-----------------|------|
| Example 4        | 15              | 94.5 |
| Example 3        | 15              | 93.1 |
| Advantage for Ex. 4 |              | 1.4  |

These results demonstrate that processing over a mixture of the ZSM-35 and ZSM-5 catalysts also gives a low pour point product with an advantage in V.I. over NiMo ZSM-5 catalyst alone.

In Examples 1–4, the NiO content of each catalyst is 1.2 weight percent and the $MoO_3$ content is 3.5 weight percent. The ZSM-5 catalyst was steamed in 100% steam six hours at 900° F. and atmospheric pressure prior to impregnation.

Although Examples 1 and 4 have utilized equal parts by weight of the two different aluminosilicate zeolites, such is not necessary. In a single-stage operation involving both zeolites, the ZSM-5 or ZSM-11 can be present from 10–90% of the total zeolite used. In two-stage operations, it is not necessary to have identical operating conditions for both stages.

EXAMPLE 5

Heavy neutral (88 grams) was hydrodewaxed with 17.6 grams of a molybdenum-impregnated extrudate (65% HZSM-35 and 35% $Al_2O_3$) at 500 psig and 550° F. in the shaker bomb. After 130 minutes reaction, the shaker bomb was opened and 17.6 grams of a cobalt and molybdenum-impregnated extrudate (65% HZSM-5 and 35% $Al_2O_3$) were added. The reaction was continued at 500 psig and 550° F. for another 65 minutes for a total of 195 minutes reaction time.

The 650° F.+ product had a 20° F. pour point and 94.4 V.I. As is obvious, this product had a sufficiently low pour point to meet practical specifications.

EXAMPLE 6
(ZSM-5 Alone)

Three 130-minute hydrodewaxing runs were made at 500 psig with 88 grams of heavy neutral and 17.6 grams of extruded catalyst (65% NiZSM-5 and 35% $Al_2O_3$). The three runs were carried out at 525, 550 and 600° F. respectively, and the 650° F.+ products had the following properties:

| Temperature, °F. | Pour Point, °F. | V.I. |
|------------------|-----------------|------|
| 525              | 50              | 98.7 |
| 550              | 20              | 92.9 |
| 600              | −35             | 80.9 |

EXAMPLE 7
(ZSM-35 Alone)

Two 130-minute hydrodewaxing runs were made at 500 psig with 88 grams of heavy neutral and 17.6 grams of extruded catalyst (65% HZSM-35 and 35% $Al_2O_3$). One was at 550° F. and the other at 590° F. The 650° F.+ product had the following properties:

| Run Temp., °F. | Pour Point, °F. | V.I.  |
|----------------|-----------------|-------|
| 550            | 60              | 103.4 |
| 590            | 60              | —     |

EXAMPLE 8
(ZSM-35 Alone)

In this example, a 130-minute hydrodewaxing run was made at 500 psig and 600° F. with 88 grams of heavy neutral and 17.6 grams of extruded catalyst (65% NiZSM-35 and 35% $Al_2O_3$).

EXAMPLE 9
(ZSM-35 Alone)

Example 8 was repeated at 550° F. with the exception that 49.4 grams of the same catalyst were used instead of 17.6 grams. Properties of the 650° F.+ product were as follows:

|        | Temp., °F. | Pour Point, °F. | V.I.  |
|--------|------------|-----------------|-------|
| Ex. 8  | 600        | 60              | 104.2 |
| Ex. 9  | 550        | 40              | 102.4 |

EXAMPLES 10–13
(Catalysts with ZSM-35 and ZSM-5 in the same pellet)

EXAMPLE 10

An extruded pellet containing 20 weight percent HZSM-35, 45 weight percent HZSM-5 and 35 weight percent alumina was impregnated to 3.5 weight percent $MoO_3$ and 1.2 weight percent NiO, dried and calcined. It was tested by hydrodewaxing 88 grams of oil with 17.6 grams of catalyst at 500 psig and 550° F. for 195 minutes.

EXAMPLES 11–13

The procedure of Example 10 was repeated with the sole exception that the extruded pellet contained 45 weight percent HZSM-35 and 20 weight percent HZSM-5, i.e. the amounts of ZSM-5 and ZSM-35 were reversed as compared to Example 10. The experiment was carried out for 130, 150 and 195 minutes.

The 650° F.+ product had the following properties:

| Example | Time, min. | Pour Point, °F. | V.I. |
|---------|------------|-----------------|------|
| 10      | 195        | −5              | 88.4 |
| 11      | 195        | −5              | 92.3 |
| 12      | 150        | 10              | 93.7 |
| 13      | 130        | 20              | 94.1 |

Comparison of Examples 6 and 13, which were tested under the same conditions shows the advantage of the novel process of this invention.

In this connection, the accompanying FIGURE shows the advantage of the mixture catalyst of Examples 11–13 over the commercially prepared 65% NiZSM-5 and 35% $Al_2O_3$ catalyst of Example 6 at pour points down to −5° F.

What is claimed is:

1. A catalyst composition comprising a mixture of (1) at least one member selected from the group consisting of ZSM-5 and ZSM-11; (2) at least one member selected from the group consisting of ZSM-23 and ZSM-35; (3) an inorganic oxide, and (4) at least one hydrogenation component selected from the group consisting of nickel, cobalt, molybdenum and tungsten.

2. The composition of claim 1 wherein all components (1)-(4) are within the same pellet.

3. The composition of claim 1 wherein some components are present as discrete particles.

* * * * *